United States Patent [19]
Fischer

[11] Patent Number: 6,042,317
[45] Date of Patent: Mar. 28, 2000

[54] NAIL WITH EXPANSION REGION

[75] Inventor: Artur Fischer, Waldachtal, Germany

[73] Assignee: Die fischerwerke Artur Fischer GmbH & Co., KG, Waldachtal, Germany

[21] Appl. No.: 08/229,472

[22] Filed: Apr. 18, 1994

[30] Foreign Application Priority Data

| Apr. 17, 1993 | [DE] | Germany | 43 12 234 |
| Apr. 26, 1993 | [DE] | Germany | 43 13 643 |
| Jul. 17, 1993 | [DE] | Germany | 43 24 069 |
| Sep. 17, 1993 | [DE] | Germany | 43 31 583 |

[51] Int. Cl.[7] ............. F16B 19/00; F16B 15/00
[52] U.S. Cl. ............ 411/508; 411/447; 411/451; 411/452
[58] Field of Search ................ 411/446, 447, 411/451, 452, 508, 509, 903, 922, 377, 542, 480, 481, 493, 908, 909

[56] References Cited

U.S. PATENT DOCUMENTS

| 171,447 | 12/1875 | Timby | 411/452 |
| 241,965 | 5/1881 | Godley | 411/452 |
| 303,663 | 8/1884 | Perkins | 411/452 |
| 373,291 | 11/1887 | Higgs | 411/481 |
| 456,723 | 7/1891 | Harvey | 411/452 |
| 2,006,813 | 7/1935 | Norwood | 411/447 |
| 2,251,202 | 7/1941 | Purtell | 411/452 |
| 2,724,303 | 11/1955 | Holcomb | 411/903 |
| 3,476,008 | 11/1969 | Pearson | 411/508 |

FOREIGN PATENT DOCUMENTS

| 1342218 | 9/1963 | France | 411/508 |
| 520368 | 5/1931 | Germany . | |
| 3345331 | 6/1985 | Germany . | |
| 3404306 | 8/1985 | Germany . | |
| 2811640 | 6/1986 | Germany . | |

*Primary Examiner*—Flemming Saether
*Attorney, Agent, or Firm*—Michael J. Striker

[57] ABSTRACT

A nail comprises a shank having a front end face, two bowed expansible arms forming an expansion region and having a free space therebetween, and a straight shank portion located before the expansion region, the free space being formed as a longitudinal channel which starts from the straight shank portion and extends to the front end face of the shank.

9 Claims, 1 Drawing Sheet

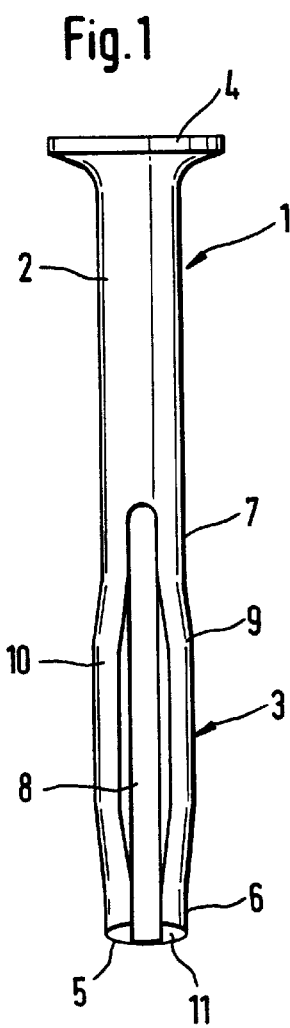
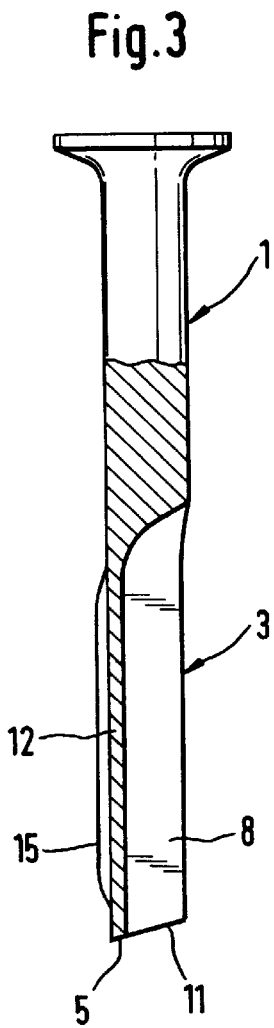
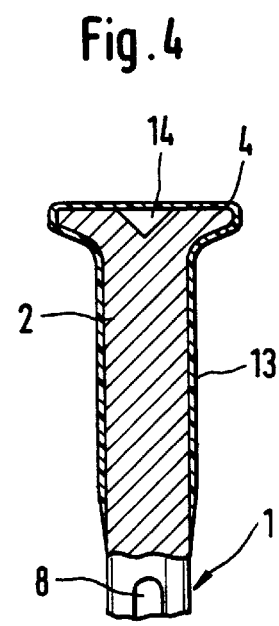
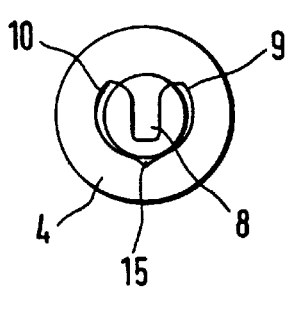
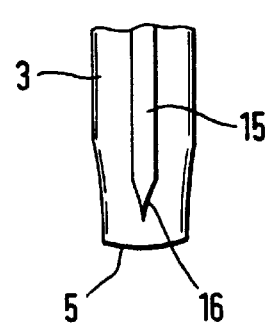

NAIL WITH EXPANSION REGION

BACKGROUND OF THE INVENTION

The present invention relates generally to nails having an expansion region.

More particularly, it relates to a nail which has an expansion region formed at a distance from a front end face of the nail and having two bowed expansible arms with a free space therebetween.

Nails of the above mentioned general type are known in the art. The German reference DE 33 45 331 A1 discloses a fixing element formed as a nail with an expansion region in the area of its front end face wherein the expansion region is formed by two outwardly bowed arms extending at a distance from one another. For anchoring of such a fixing element the shank of the fixing element is driven into a pre-drilled hole in masonry or similar material. When the shank is driven into the drilled hole, the expansible arms are compressed inwards by the wall of the drilled hole. An increased pressure by the expansible arms against the wall of the drilled hole can be achieved by an insert located between the expansible arms. After the driving-in operation, the expansible arms of the fixing element are pressed by the plastic and/or resilient restoring force of the insert against the wall of the drilled hole. As a result a correspondingly high holding force is achieved. However, because of the insert the resistance of the known nail to being driven in is very high.

SUMMARY OF THE INVENTION

Accordingly, it is an object of the present invention to provide a nail having an expansion region, which avoids the disadvantages of the prior art.

More particularly, it is an object of the present invention to provide a nail having an expansion region, which on the one hand can be inserted without difficulty into a hole drilled in masonry and on the other hand has high holding values.

In keeping with these objects and with others which will become apparent hereinafter, one feature of the present invention resides, briefly stated, in a nail having an expansion region formed at a distance from a front end of the nail and provided with laterally projecting bowed expansible arms, wherein a free space between the expansible arms is formed as a longitudinal channel which starts from a straight shank portion lying before the expansion region as considered in a driving-in direction and extending as far as the front end face of the nail.

When the nail is designed in accordance with the present invention, it avoids the disadvantages of the prior art and provides for the above mentioned highly advantageous results.

The laterally projecting expansible arms formed by the longitudinal channel are pressed inwards by elastic and resilient deformation as the nail is driven into a drilled hole, and consequently form a frictional engagement with the wall of the drilled hole. Due to the resilient and plastic deformation component of the expansion region, high holding values are achieved. The resilient deformation component also enables the nail to compensate for any widening of the drilled hole, for example as a result of cracks forming, without significant loss of holding values.

The longitudinal channel which starts in the straight shank section lying before the expansion region and extending as far as the front end face of the nail, provides a high degree of flexibility at the transition zones of the expansion region, which considerably reduces the resistance of the nail being driven in, in particular into narrow drilled holes. Furthermore, the longitudinal channel which is open at the front end face of the nail provides a means whereby the drilling dust present in the drilled hole is accommodated as a nail is being driven in. The longitudinal channel extends as far as the end face and therefore prevents the drilling dust from accumulating at the end face of the nail and hampering or even preventing the operation of driving in of the nail. The drilling dust fills the longitudinal channel and as a result increases the holding values, since the drilling dust additionally acts as a friction-producing agent.

In accordance with a further feature of the present invention, the expansion region can be formed by expanding the shank symmetrically by an indenting operation using a wedge, and at the same time the smooth transitions are molded.

In accordance with a still further especially advantageous feature of the present invention, the outer surface of the expansible arm has an approximately circular shape in cross-section, namely with a diameter slightly larger than that of the shank. The rounding and the expansion region thus corresponds approximately to the rounding of the shank and the wall of the drilled hole, with the result that a uniform face-to-face contact against the wall of the drilled hole is achieved also in the expansion region. The nail consequently braced in the expansion region against the drilled hole not only in point-to-point contact but also in face-to-face contact, which produces considerably better holding values. Beveling the longitudinal edges of the expansible arms facilitates bending-in of the expansible arms as the nail is driven into the drilled hole.

In accordance with another feature of the present invention, the longitudinal channel may have a U-shaped cross-section which is achieved by using a suitable wedge for the indenting process. In the area of the bottom of the channel, the expansion region therefore has as uniform a cross-section as is possible. This imparts a high resilience to the bowed expansible arms.

The nail may be provided with a plastic material covering starting from the nail head and ending before the expansion region. This provides additional protection against corrosion in that the covering seals the drilled hole in the region of the mouth of the drilled hole.

The nail according to the invention, after being entered in a drilled hole, can only be removed again from it with extreme difficulty. Therefore, in accordance with a further development of the invention a nail head provided on its upper face has a centering indentation which is aligned centrically with respect to the center line of the shank. The centering indentation enables the nail head to be drilled off exactly, using a drill bit with a diameter corresponding to the diameter of the shank. In this manner, for example, a board fixed to a wall can be removed without problems from the headless nail, if such a dismantling operation is required.

In accordance with still a further feature of the present invention, the front face of the nail is provided with a slope to form a nail tip. This improves the flow of drilling dust into the longitudinal channel as the nail is being driven in.

In accordance with a further embodiment of the invention, the expansion region of the nail can be provided with a longitudinal rib having a triangular cross-section and arranged opposite to the longitudinal channel. The longitudinal rib which projects beyond the outer periphery of the expansion region provide a further engagement in the drilled hole in addition to the two expansible arms. Therefore on the one hand a centering effect is produced by the three-point contact and on the other hand a greater pressing action by the expansible arms is achieved. The longitudinal rib also compensates for tolerances in the drilled hole due to its triangular shape. In the case of relatively narrow drilled holes, the longitudinal rib digs deeper, while in the case of wider drilled holes it digs to a lesser extent into the wall of the drilled hole. Therefore constant friction of the expansion region is produced substantially independently of the diameter of the drilled hole.

Finally, the longitudinal rib can terminate in a tapering point at a distance from the front end face of the nail. This facilitates introduction and driving-in of the nail-type plug having a longitudinal rib into the drilled hole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a nail having an expansion region in accordance with the present invention;

FIG. 2 is a plan of the front face of the nail of FIG. 1;

FIG. 3 is a view showing a longitudinal section of the inventive nail;

FIG. 3a is a view showing a rear side of the front part of the nail of FIG. 1; and FIG. 4 is a view showing a plastic covering of the nail of FIG. 1 in accordance with the present invention.

DESCRIPTION OF THE PREFERRED EMBODIMENTS

A nail in accordance with the present invention shown in FIG. 1 is identified as a whole with reference numeral 1. The nail has a shank 2 with an expansion region 3, and a nail head 4. The nail has a front end face 5. The expansion region 3 is set back slightly from the front end face 5 so that a front straight shank portion 6 is provided between the front end face 5 and the expansion region 3. Another longer rear straight shank portion 7 is located between the expansion region 3 and the nail head 4. The nail 1 can be made from metal.

In the expansion region 3 the nail is provided with a longitudinal channel identified with reference numeral 8. The channel can be formed by an indenting process with use of a wedge. The longitudinal channel 8 can have a U-shaped cross-section as can be more clearly seen from FIG. 2. The longitudinal channel 8 is bounded by lateral expansible arms 9 and 10. The arms bow outwards and project from the shank 2. The longitudinal channel 8 is open at the front end face 5, and the front end face 5 is provided with a slope 11. Therefore, drilling dust can be guided more efficiently into the longitudinal channel 8 as the nail is being driven in.

The U-shape of the longitudinal channel 8 is clearly shown in FIG. 2. In the region of the bottom of the channel there is a uniform wall thickness for the expansion region 3 so that a high resilience of the outwardly bowed expansible arms 9 and 10 is provided. Longitudinal edges of the expansible arms 9 and 10 are beveled in order to promote inward bending and positioning of the arms against the wall of the drilled hole.

FIG. 3 shows a nail of FIG. 1 in a longitudinal section turned by 90°. The slope 11 at the front end face 5 of the nail runs from the open side of the longitudinal channel 8 at an acute angle to the bottom 12 of the longitudinal channel.

As shown in FIG. 4, the nail 1 is provided with a plastic material covering 13 in the area of the nail head 4 and the shank 2. The plastic material covering 13 terminates flush with the shank 2 before the expansion region 3.

The nail head 4 has a top face provided with a centering indentation 14. The indentation 14 is aligned centrally with respect to the longitudinal axis of the shank 2.

The nail 1 further has a longitudinal rib 15 which is provided at the expansion region 3 as shown in FIGS. 2, 3 and 3a. The longitudinal rib 15 has a triangular profile and is located opposite to the longitudinal channel 8. The longitudinal rib 15 ends at a distance from the end face 5 of the nail and has a tapering point 16 in order to ease insertion and to facilitate driving of the nail 1 into a drilled hole.

It will be understood that each of the elements described above, or two or more together, may also find a useful application in other types of constructions differing from the types described above.

While the invention has been illustrated and described as embodied in a nail with an expansion region, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A nail, comprising a shank having front face, two bowed bendable arms forming an expansion region and having a free space therebetween, a first straight shank portion located forwardly of said expansion region and a second straight shank portion located rearwardly of said expansion region, said arms being bowed outwardly by indenting said shank symmetrically relative to a longitudinal axis of said shank and having a first end merging into said first straight shank portion with a smooth transition and a second end merging into said second straight shank portion with a smooth transition, said free space being formed as a longitudinal channel which has a depth corresponding to at least half a thickness of said shank, starts at said second straight shank portion and extends to said front and face of said shank.

2. A nail as defined in claim 1, wherein said expansion region has a substantially rounded cross-section, said arms having longitudinal edges which are beveled.

3. A nail as defined in claim 1; and further comprising a nail head connected with said shank, said second shank portion being located adjacent to said nail head; and a plastic material covering arranged on said nail head and on said second shank portion.

4. A nail as defined in claim 3, wherein said plastic material covering terminates flush on said shank before reaching said expansion region.

5. A nail as defined in claim 1; and further comprising a nail head having a top face which is provided with a centering indentation aligned centrally with respect to a longitudinal axis of said shank.

6. A nail as defined in claim 1, wherein said front end face of said shank has a nail tip formed by a slope.

7. A nail as defined in claim 1; and further comprising a longitudinal rib provided on said shank in said expansion region and located opposite to said longitudinal channel.

8. A nail as defined in claim 7, wherein said longitudinal rib has a triangular profile.

9. A nail as defined in claim 7, wherein said longitudinal rib terminates at a distance from said front end face of said shank in a tapering point.

* * * * *